United States Patent

[15] 3,699,848

Prendergast

[45] Oct. 24, 1972

[54] RADIAL PISTON FLUID PRESSURE MOTOR

[72] Inventor: Charles Scott Prendergast, Worthing, England

[73] Assignee: Cam Rotors Limited

[22] Filed: Feb. 10, 1971

[21] Appl. No.: 114,144

Related U.S. Application Data

[63] Continuation-in-part of Ser. No. 825,507, May 19, 1969, abandoned.

[30] Foreign Application Priority Data

May 23, 1968 Great Britain..........24,727/68

[52] U.S. Cl......................................91/487, 91/498
[51] Int. Cl..............................................F01b 13/06
[58] Field of Search ...418/31; 91/488, 491, 497, 498

[56] References Cited

UNITED STATES PATENTS

| | | | |
|---|---|---|---|
| 1,987,781 | 1/1935 | Maw............................ | 91/497 |
| 2,170,786 | 8/1939 | McElroy et al.............. | 418/31 |
| 2,588,342 | 3/1952 | Bidwell........................ | 91/491 |
| 2,612,110 | 9/1952 | Delegard...................... | 418/82 |
| 2,862,455 | 12/1958 | Ferris .......................... | 91/488 |
| 3,046,950 | 7/1962 | Smith .......................... | 91/498 |
| 3,560,118 | 2/1971 | Palachik...................... | 418/31 |
| 3,619,089 | 11/1971 | Pierrat........................ | 418/171 |

FOREIGN PATENTS OR APPLICATIONS 1,947,585    6/1970    Germany.....................91/491

*Primary Examiner*—William L. Freeh
*Attorney*—Holcombe, Wetherill & Brisebois

[57] ABSTRACT

A hydraulic pump or motor has a central cylinder block formed with eight cylinders of rectangular cross-section. Each containing a piston which projects radially outwards from the cylinder block, and maintains contact with a cam surface formed on the inner surface of a surrounding cam ring. Each piston comprises a rectangular shoe which is a sliding fit in its cylinder and which carries a roller on a partly circular seating which extends over the axial length of the shoe, the roller following the cam surface. The seating is relieved to provide a space in which oil pressure can develop and substantially balance the reactive force between the roller and the cam. As the cylinder block rotates the pistons reciprocate within their cylinders as the rollers follow the cam surface. Hydraulic pressure at the bottom of a shoe is normally used to maintain contact between a piston and the cam ring, but springs may also be used. The space at the bottom of each piston shoe communicates alternately with inlet and outlet ports in a member which is rigid with the cam ring and which may be a plate with face ports or a cylindrical pintle with radial ports.

In one example the cam surface is formed so that each piston performs six cycles of reciprocation per revolution, the nature of each cycle being such that the total displacement of the unit remains uniform at a uniform rate of rotation and the radial pressure reaction between the cam ring and the cylinder block is always balanced.

In another example the form of the cam ring is in two generally semi-cylindrical parts which are movable and which can be jointly adjusted radially in relation to the central axis to vary the length of stroke of the pistons.

One kind of fluid pressure unit has a rotor and a coaxial stator one of which surrounds the other and is formed with an internal cam surface while the inner member is formed with two or more cylinders arranged substantially radially each containing a piston which has an end projecting from the cylinder against the cam surface and which slides to and fro in the cylinder as the rotor rotates in use. Such units have external outlet and inlet connections with which each cylinder communicates in the angular positions of the rotor in which the corresponding piston slides respectively inwards and outwards within that cylinder. Either the inner or the outer member may be the rotor.

Although it is possible to use these units as motors or pumps, one of their main application is as relatively low speed, high torque motors. In this application their weight and size for a given output torque compare very favorably with those of a high-speed motor, electric or hydraulic, combined with reduction gearing, which is the conventional alternative.

7 Claims, 6 Drawing Figures

RADIAL PISTON FLUID PRESSURE MOTOR

This application is a continuation-in-part of my prior application, Ser. No. 825,507 filed May 19, 1969, and now abandoned.

It is an object of this invention to provide a fluid pressure unit of the kind described which, for a given output torque is smaller and lighter than has heretofore been possible.

A further object of the invention is to increase the mechanical efficiency of such fluid pressure units by mounting rollers on the outer ends of the pistons and balancing the reaction between the rollers and the cam surface by fluid pressure admitted to a space between said rollers and their seating in said piston ends.

These and other objects of the invention may be attained in a fluid pressure unit of the kind described in which the cylinders are of rectangular cross-section and each piston comprises a rectangular shoe which is a sliding fit within the corresponding cylinder and a roller mounted in a part-cylindrical seating in the outer end of the shoe, said seating having a recessed central portion to which pressurized lubricant may be admitted to substantially balance the reaction between said roller and the cam surface.

The length of rollers is preferably substantially equal to that of the shoe cross-section, and the diameter of the rollers should similarly be substantially equal to the width of the shoes. The recessed portion of the seating can then extend over all of the seating except for a marginal sealing portion thereof.

In most cases, the working fluid in the unit is oil which can conveniently be admitted to the space between the roller and the recessed portion of the seating by a drilling extending radially through the shoe. The side and/or end faces of the shoe may be grooved to receive seals which wipe over the cylinder walls, and pressurized fluid may be admitted to the grooves behind the seals to urge the seals against the cylinder walls.

The cylinders can communicate with external inlet and outlet connections at the appropriate angular positions of the rotor through ports in relatively rotatable parts of the unit arranged to move into and out of register with one another as the rotor rotates. In one arrangement the cylinders lie between two port plates which, together with the cam surface, rotate relatively to the cylinders about the axis of the rotor and each cylinder has an axial inlet port which registers with a port in one of the plates in angular positions of the rotor in which the piston slides in one direction, and an axial outlet port which registers with a port in the other of the plates in the angular positions of the rotor in which the piston slides in the other direction, the ports in one of the plates communicating with an external inlet connection and the ports in the other of the plates communicating with an external outlet connection. The port plates are rigid with the cam ring.

In an alternative arrangement, each cylinder has a radial port which registers alternately with a series of inlet and outlet ports formed radially in a co-axial pintle member which is rigidly connected to the cam ring and which has two passages, one terminating in the external inlet connection and the other terminating in the external outlet connection, each cylinder communicating with each of the passages in turn through its port which moves into and out of register with the ports in the pintle during relative rotation.

The displacement of a unit and therefore the torque delivered as a motor can be made variable by forming the cam surface into two substantially semi-cylindrical sections which are arranged to be moved together or apart to vary the stroke of the pistons. If on the other hand the displacement is not variable, the shape of the cam surface can be such that the displacement, and therefore the torque delivered, is independent of the angular position of the rotor. Preferably in a high torque motor there are eight similar and equally spaced pistons and the cam surface has six equally spaced radial recesses so that each piston performs six cycles during one revolution of the rotor.

In certain applications it is desirable that a motor should be free to idle with very little torsional resistance. To achieve this result a flow control system may be incorporated which can reduce the hydraulic pressure in the cylinders to a negligible value while allowing a moderate hydraulic pressure to exist between the outside of the cylinder block and the surrounding cam ring. This causes the pistons to remain at their inmost positions so that the rollers no longer make contact with the cam surface. In a further adaptation of this arrangement two sets of pistons may be used to provide a two speed hydraulic motor, one set of pistons operating in the normal manner while the second set is rendered inoperative.

Two examples of motors constructed in accordance with the present invention are illustrated in the accompanying drawings, in which.

Figure 1:
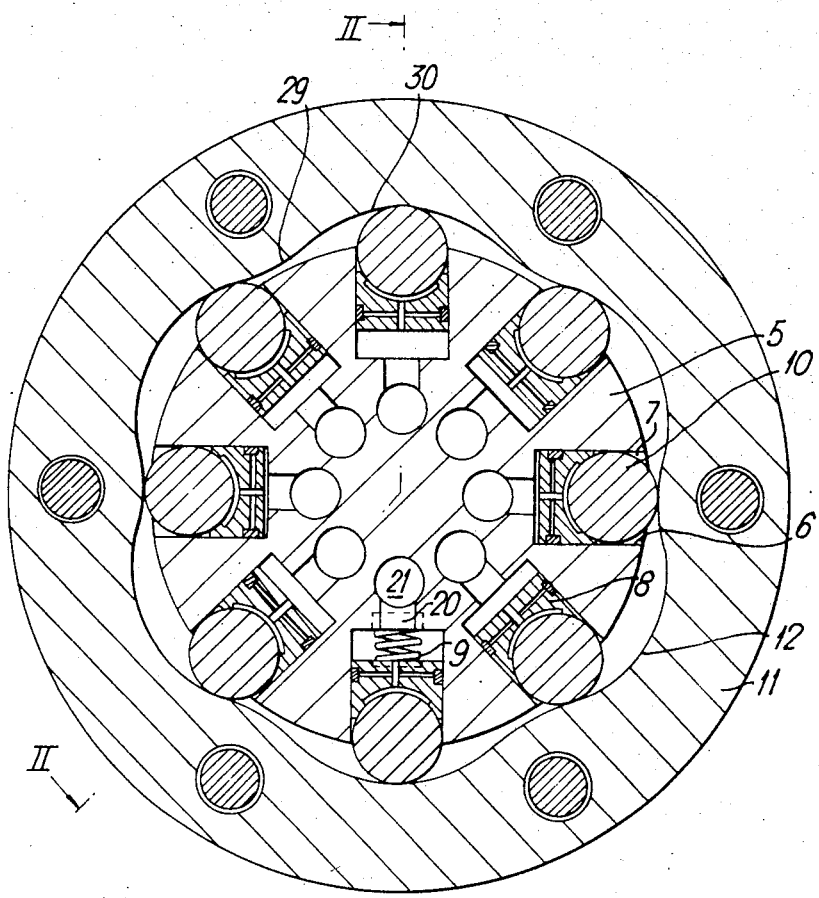
FIG. 1 is a radial section of the first example.
Figure 2:
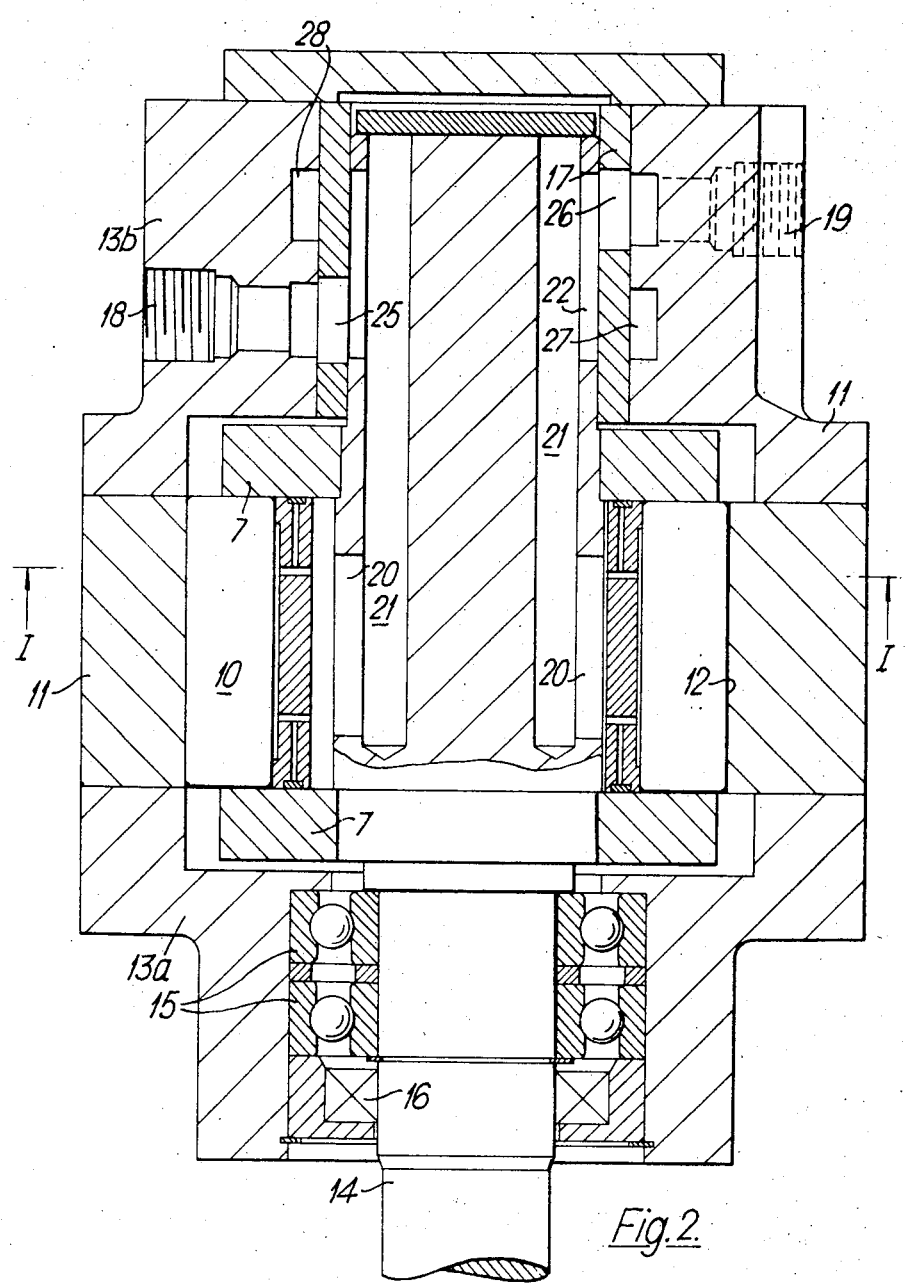
FIG. 2 is a section taken on the line 2—2 in FIG. 1.

The first example has a cylinder block 5, in which eight equally spaced axial slots 6 are formed. Two annular plates 7 fixed rigidly to the ends of the cylinder block 5 close up the ends of the slots 6 which thus form cylinders of rectangular cross section. A piston or shoe 8 slides in each of the slots and may be urged radially outwards by a spring 9. Each piston is rectangular in cross-section and has an outer end fitted with a cylindrical roller 10. The mounting of the roller 10 on the shoe 8 will be described in more detail with reference to FIGS. 5 and 6.

An outer member 11 includes a cam ring 12 which surrounds the cylinder block 5 co-axially with cam surfaces which are offered to the cylindrical rollers 10 of the pistons. The outer member 11, has rigid extensions on either side of it 13a and 13b. The cylinder block 5 is integral with a shaft 14 which is carried in bearings 15 housed in the extension 13 a, of the outer member 11, with a cooperating seal ring 16.

A pintle 17 is a sliding fit over a circular extension of the cylinder block and is fitted rigidly inside the extension 13b of the outer member 11. The pintle has two rows of six ports 25 and 26 formed around its circumference one row being located in a different axial position to the other row. Each row of ports connects to separate annuli 27 and 28 formed in the extension 13b and these annuli connect to two external ports 18 and 19 also formed in the extension 13 b of the outer member 11.

Each of the cylinders 6 has, at its radially inner end, a radial port 20 which connects to an axial channel 21 which connects to a further radial port 22 formed in the circular extended portion of the cylinder block 5. The radial ports 22 move in and out of register with the pintle ports 25 and 26 during relative rotation.

During relative rotation, as seen in FIG. 1, the pistons 8 slide inwards and outwards within their cylinders as their cylindrical rollers 10 follow the cam surface 12. The positions of the pintle ports 25 and 26 are such that in the angular positions of the cylinder block in which a particular piston os sliding radially outwards in its cylinder, the corresponding port 22 in the cylinder block extension is in register with one of the ports 25 or 26 in the pintle and the working fluid, from an annulus 27 or 28, flows into the cylinder via the radial port 22, the axial channel 21 and the final radial port 20. Similarly when a particular piston is sliding radially inwards the working fluid is discharged from the cylinder through the radial port 20, through the axial channel 21 and the radial port 22 through one of the pintle ports 25 or 26 into the other annulus 27 or 28, and out through one of the external ports 18 or 19. Reversal of direction of rotation reverses the direction of flow of the working fluid.

The cam surface 12 has six recesses 30 separated by six ridges 29 so that each piston performs six cycles of reciprocation, relative to its cylinder, during each revolution. The contour of the recesses and ridges, which is not accurately shown in the drawing, is such that, as the rotor rotates at constant angular speed, each half cycle of a piston comprises a first portion during which the piston is at rest, a second portion during which it moves with constant acceleration, a third portion during which it moves with constant velocity, a fourth portion during which it moves with constant deceleration and a fifth portion when it is again at rest at the end of the half cycle. The third portion of the half cycle occupies the same angular displacement as the sum of the first and fifth portions. The second portion occupies the same angular displacement as the fourth portion.

As can be seen in FIG. 1 each piston is out of phase with its neighbors by one quarter of a cycle. It follows that, of any four adjacent pistons, two are always on an outward-moving half cycle and two are engaged on the other, inward-moving half cycle. Of the two engaged on the outward moving half cycle, either one is at rest and the other moving with constant velocity, and therefore inducing working fluid into its cylinder at a constant rate, or one is accelerating and the other decelerating, the sum of their velocities, and therefore the rate at which fluid is induced into the two cylinders together, remaining constant. Provided the sum of the velocities is constant, the acceleration and deceleration during the second and fourth portions of the half cycle need not be uniform but may for example be cycloidal. The same applies to the two pistons occupied with the inward moving half of the cycle, with the result that the total rate of fluid displacement of a unit is uniform, provided that the speed rotation of the rotor is uniform. Therefore the output torque of a motor is also uniform when supplied with hydraulic fluid at a uniform pressure.

The illustrated combination of eight pistons and a cam surface giving six cycles of each piston per revolution has the advantage that diametrically opposite pistons are in phase with one another with the result that their reactions on the cylinder block are equal and opposite thus saving the shaft bearings from any unbalanced thrust.

Figure 3:
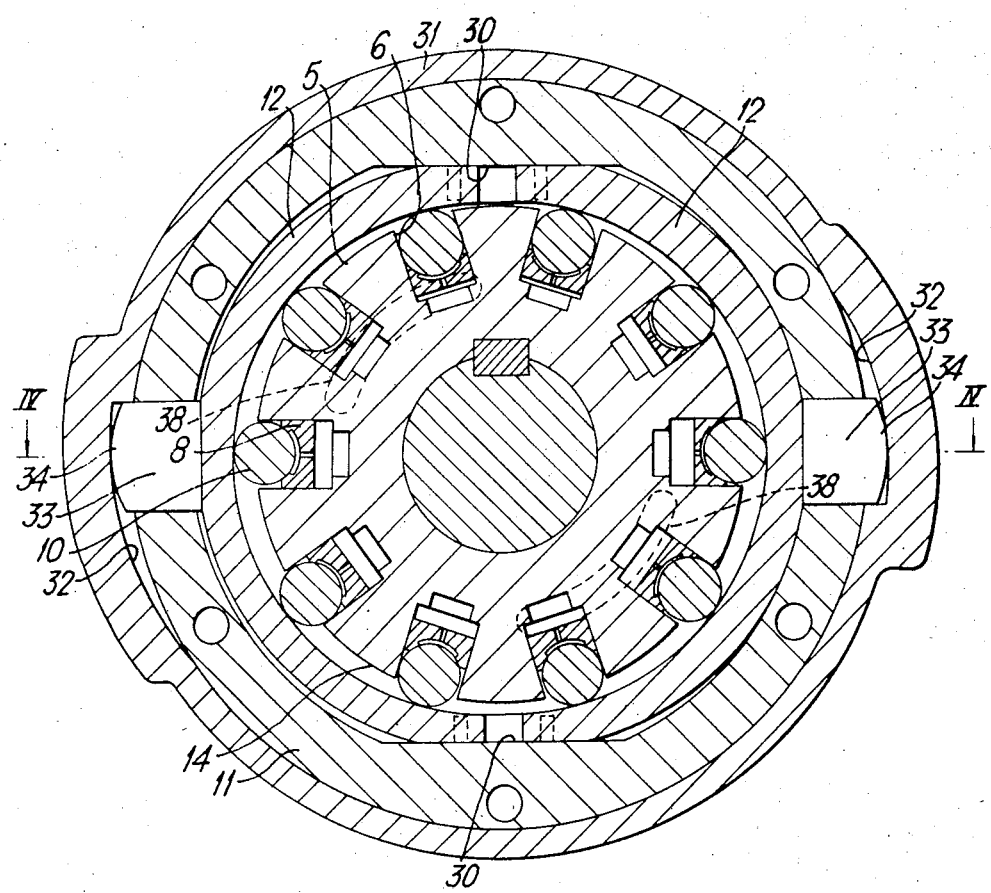
FIG. 3 is a radial section through the second example.
Figure 4:
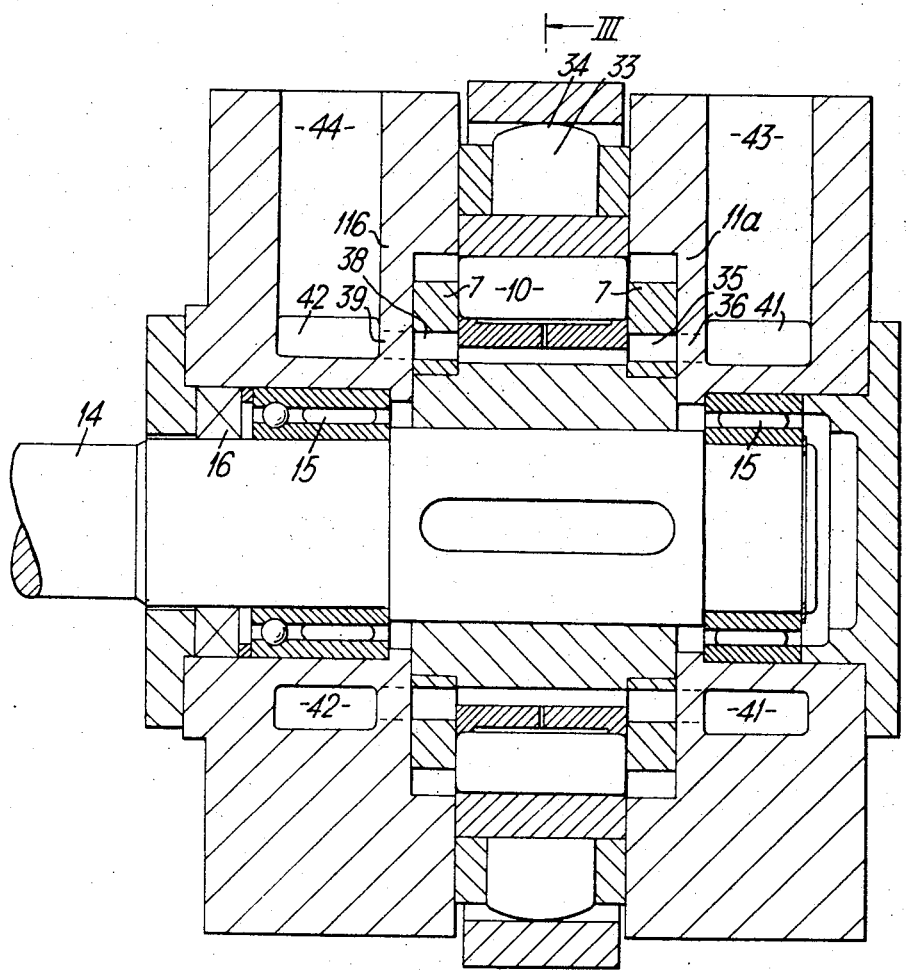
FIG. 4 is a section taken on the line 4—4 in FIG. 3.

The unit shown in FIGS. 3 and 4 differs from the example just described in that the displacement is variable and in that the inlet and outlet ports are differently arranged. A rotor 5 is formed with axial slots 6 closed at each axial end by an annular plate 7 to form cylinders of rectangular cross-section. A piston 8 slides in each cylinder and may be urged radially outwards by a spring, not shown. The rotor is keyed on to a shaft 14 which is held in bearings 15 and provided with oil seals 16.

A cam ring 12 surrounds the rotor 5 and is in two substantially semi-cylindrical sections. Each section is formed with a flat which slides against a flat surface 30 in the stator 11. The two sections are therefore movable together or apart to vary the stroke of the pistons, the stroke being zero when the two halves are moved together so that their inner surfaces make up a single circular cylinder surrounding the rotor co-axially. Each section of the cam ring 12 is formed along its edges with alternate circumferential projections and recesses, the projections on one section mating with the recesses on the other section. When the two sections are separated to give maximum stroke, the pistons follow the projections as they leave one section and are then smoothly engaged by the other section.

To move the two sections of the cam ring 12 together and apart, the stator 11 is surrounded by a ring 31 which is formed with two circumferentially tapering recesses 32. Each of the cam ring sections is provided with a cylindrical boss 33 projecting through a hole in the stator 11 and having a domed head 34 which bears against the bottom of the recess 32 in the ring 31. In FIG. 3 the cam ring sections are shown at their furthest apart giving maximum stroke to the pistons. Rotation of the ring 31 clockwise, as seen in FIG. 3, forces the two sections of the cam ring together reducing the stroke of the pistons. The pressure of the working fluid in the cylinders beneath the pistons 8 forces the pistons outwards against the cam ring and there is therefore no need to prevent the sections moving towards each other under the influence, for example, of their own weight. If springs are fitted between the inner ends of the cylinders and the pistons the spring forces also tend to keep the cam ring sections separated.

An inlet port 35 leads axially from one side of each of the cylinders 6 and registers with one of two ports 36 in a port plate 11a forming part of the stator 11 in the angular positions of the rotor in which the corresponding piston follows a part of the cam surface 13 of increasing radius. Similarly an outlet port 38 leads axially from the other side of each cylinder and registers with one of two ports 39 in a port plate 11b forming part of the stator 11 as the piston follows a part of the cam surface of decreasing radius. The inlet and outlet ports 36 and 39 open into inlet and outlet passages 41 and 42 which lead to inlet and outlet connections 43 and 44 respectively.

Either of the porting arrangements described can be used in combination with either of the cam rings. For applications where convenient the cam ring can rotate around a fixed cylinder block the only modifications then needed to the motors described being concerned with the inlet and outlet passages and providing fixed inlet and outlet connections.

Figure 5:
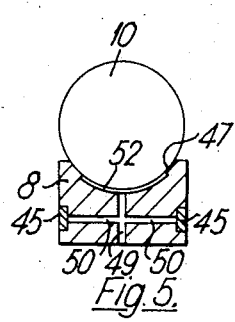
FIGS. 5 and 6 illustrate a piston comprising a roller and shoe.
Figure 6:
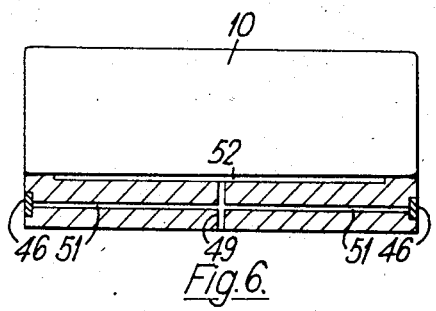

The pistons 8 of the two machines illustrated in FIGS. 1 to 4 are identical, one being shown in detail in FIGS. 5 and 6. The roller 10 is shown in position on the partly circular seating 47 of the piston shoe 8. Sealing strips 45 are fitted in grooves on each side of the piston shoe 8 and sealing strips 46 are fitted in grooves at each end of piston shoe 8.

A radial hole 49 connects the inner end of the piston shoe 8 to a recess 52 forming an oil reservoir between the roller 10 and the piston shoe 8. Cross holes 50 and longitudinal holes 51 connect the radial hole 49 to the grooves formed in the piston shoe 8 so that hydraulic pressure is available to press the sealing strips 45 and 46 against the walls of the cylinder.

The force exerted on the roller by the oil pressure in the reservoir 52 balances the reaction force between the roller and the cam ring. These two forces, i.e., the oil pressure force and the reaction force, are both dependent on the pressure of the fluid in the cylinder containing the shoe. The pressure force is therefore always less than the reaction force, whereby the roller never leaves its seating and permits oil to escape from the reservoir, but is always sufficient to keep the frictional forces between the roller and the seating below an acceptable maximum.

I claim:

1. A fluid pressure unit comprising a first assembly, a second assembly, bearing means mounting said first assembly to said second assembly and adapted to permit relative rotation therebetween, said first assembly including means providing an internal cam surface and said second assembly including a plurality of cylinders of rectangular cross-section, an equal plurality of piston shoes of rectangular cross-section each contained within a different one of said cylinders, a cylindrical roller for each piston shoe rotatably mounted in a part-cylindrical seating in the outer end thereof and adapted to follow a said cam surface, means for admitting pressurized lubricant to each of said seatings, means for admitting fluid to said cylinders, and means for discharging said fluid from said cylinders, each of said part cylindrical seatings for said rollers comprising a marginal portion adapted to contact said roller, a recessed portion adapted to be spaced from said roller, and means for admitting pressurized lubricant to said recessed portion whereby reaction forced between said roller and said cam surface are balanced by pressure of said lubricant on said roller, while said means for admitting pressurized lubricant to said recessed portion of said seating comprises an opening from said recessed portion through said piston shoe into said cylinder, whereby hydraulic working fluid in said cylinder serves additionally as said pressurized lubricant, and each of said piston shoes includes seal means for contacting the walls of said cylinders and means for admitting said working fluid behind said seals whereby said seals are urged against said cylinder walls.

2. A unit according to claim 1, wherein said means for admitting fluid into said cylinders comprises a plurality of inlet ports, one communicating with each cylinder, a port plate disposed to one side of said cylinders and adapted to rotate relatively to said cylinders, and ports in said port plate registering with the inlet ports to the cylinders in turn upon relative rotation between said first and second assemblies, and said means for discharging said fluid from said cylinders comprises a plurality of outlet ports, one communicating with each cylinder, an outlet port plate disposed on the other side of said cylinders and adapted to rotate relatively to the cylinders, and outlet ports in said outlet port plate which register with said outlet ports from said cylinders in turn upon relative rotation between said first and said second assemblies.

3. A motor according to claim 1 wherein said first assembly comprises a ring surrounding said pistons and having an inward facing surface which constitutes said cam surface and said second assembly comprises a cylinder block which includes said cylinders, a circular extension of said cylinder block coaxial with the axis of relative rotation between said first and said second assemblies, a plurality of ports through which each of said cylinders communicates with a plurality of axial channels in said extension and a plurality of radial ports through which each of said axial channels communicates with radial ports formed in a pintle rigid with said ring and disposed around said extension, annular spaces surrounding said pintle, and external ports communicating with said annular spaces and adapted to register with said plurality of ports in said block in turn during relative rotation between said first and second assemblies.

4. A unit according to claim 1 wherein said means providing said cam surface comprises two generally semi-cylindrical parts, means mounting said parts so as to be movable towards and away from one another and means for moving said parts together or away from one another to vary the stroke of said pistons.

5. A unit according to claim 1 wherein at least one group of four pistons are equiangularly disposed around said axis of relative rotation and the form of said cam surface is such that each piston performs a plurality of cycles of reciprocation relative to the respective cylinder during each revolution of said first assembly relative to said second assembly and in all relative positions of the assemblies is one quarter of a cycle out of phase with two others of said pistons, and each cycle comprises, as said first assembly turns at constant speed relatively to said second assembly, a first portion during which said piston is at rest, a second portion during which said second piston accelerates in said respective cylinder a third portion during which said piston moves with constant velocity, a fourth portion during which said piston decelerates at a rate complementary to said acceleration during said second portion and a fifth portion during which the piston is at rest before the end of said half-cycle whereby the total displacement of said unit is independent of the angular position of said first assembly relatively to said second assembly.

6. A unit according to claim 5 wherein the form of said cam surface is such that said acceleration during said second portion and said deceleration during said fourth portion are uniform and are equal and opposite.

7. A unit according to claim 5 including two groups of four pistons, each piston being disposed diametrically opposite to and moving in phase with a piston belonging to a different group whereby radial forces reacting on the rotor are balanced.

* * * * *